Nov. 27, 1934. A. M. JOHNSON 1,982,389
RODENT TRAP
Filed Oct. 12, 1933 3 Sheets-Sheet 1

Inventor
A. M. Johnson
By Clarence A. O'Brien
Attorney

Nov. 27, 1934.  A. M. JOHNSON  1,982,389
RODENT TRAP
Filed Oct. 12, 1933   3 Sheets-Sheet 2

Inventor
A. M. Johnson

Nov. 27, 1934.   A. M. JOHNSON   1,982,389
RODENT TRAP
Filed Oct. 12, 1933   3 Sheets-Sheet 3

Inventor
A. M. Johnson
By Clarence A. O'Brien
Attorney

Patented Nov. 27, 1934

1,982,389

UNITED STATES PATENT OFFICE 1,982,389

RODENT TRAP

Alfred M. Johnson, Arlington, Wash.

Application October 12, 1933, Serial No. 693,342

2 Claims. (Cl. 43—66)

This invention appertains to new and useful improvements in traps for animals, rodents and like creatures, the principal object being to provide a trap of low cost to manufacture and a trap which can be easily emptied.

Another important object of the present invention is to provide a trap constructed from a transparent jar or like container, and this principally so that the interior of the trap can be viewed at all times.

These and various other important objects and advantages of the invention will become apparent to the reader of the following specification.

In the drawings:—

Figure 6:
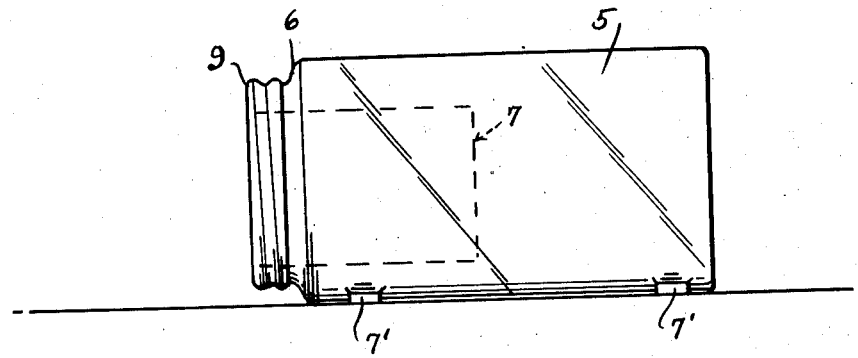
Figure 6 represents a side elevational view of the trap.
Figure 7:
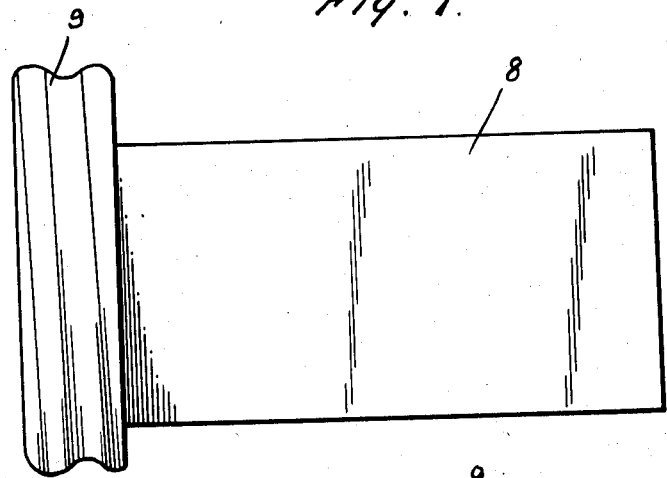
Figure 7 represents a side elevational view of the closure unit.
Figure 8:
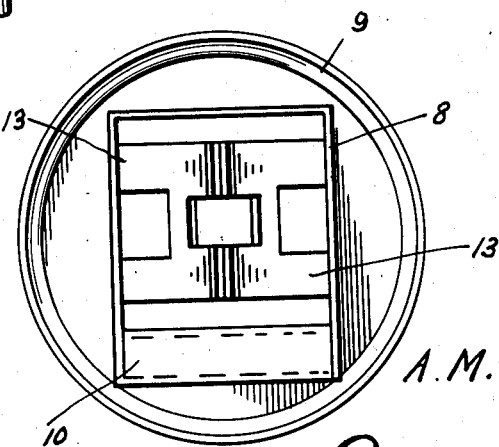
Figure 8 represents an inside elevational view of the closure unit.

Referring to the drawings wherein like numerals designate like parts, it can be seen that numeral 5 represents a cylindrical, transparent container which is provided with a thread formed neck 6. It is probable that this transparent container 5 can be of the usual fruit jar type, but may be manufactured specially for this purpose and provided with laterally disposed supporting means 7, as shown in Figure 6.

Numeral 7 generally refers to the closure which consists of an elongated tunnel-like member 8 preferably of square cross section, attached at its outer end to the edge portion of a square-shaped opening in the cap structure 9 which engages over the neck 6.

The inner end of the tunnel-like structure 8 is also open. A super-floor 10 is provided inside of this tunnel-like structure 8 and is provided with a longitudinally extending slot 11 therein.

The cap 9 is provided with a small swingable closure 12 at the lower portion of the opening therein which serves to normally close the outer end of the bait compartment between the bottom of the tunnel-like structure 8 and the super-floor 10.

Figure 1:
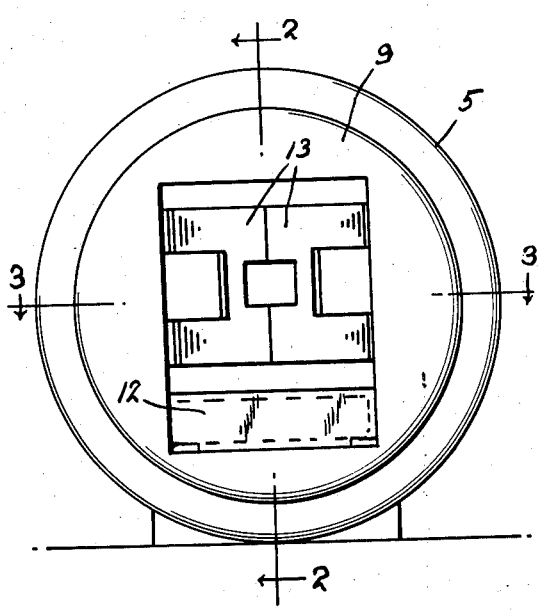
Figure 1 represents a front elevational view of the trap.
Figure 4:
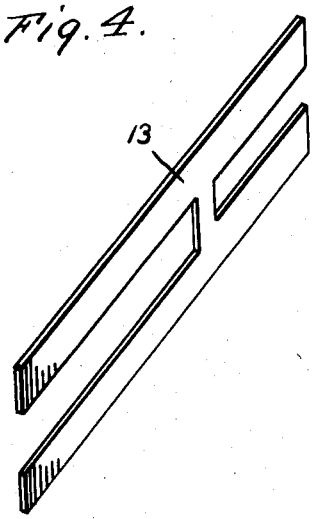
Figure 4 represents a perspective view of one of the spring members.
Figure 2:
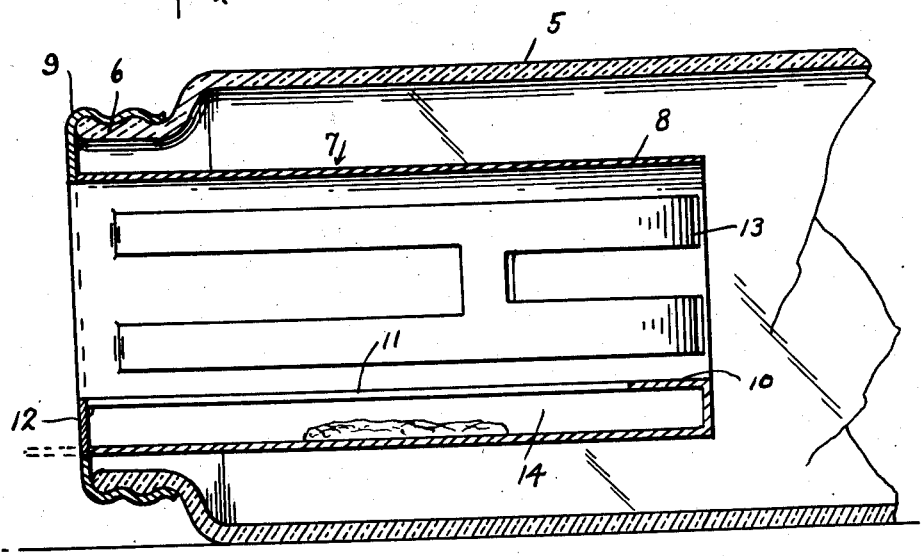
Figure 2 represents a longitudinal sectional view taken substantially on line 2—2 of Figure 1.
Figure 3:
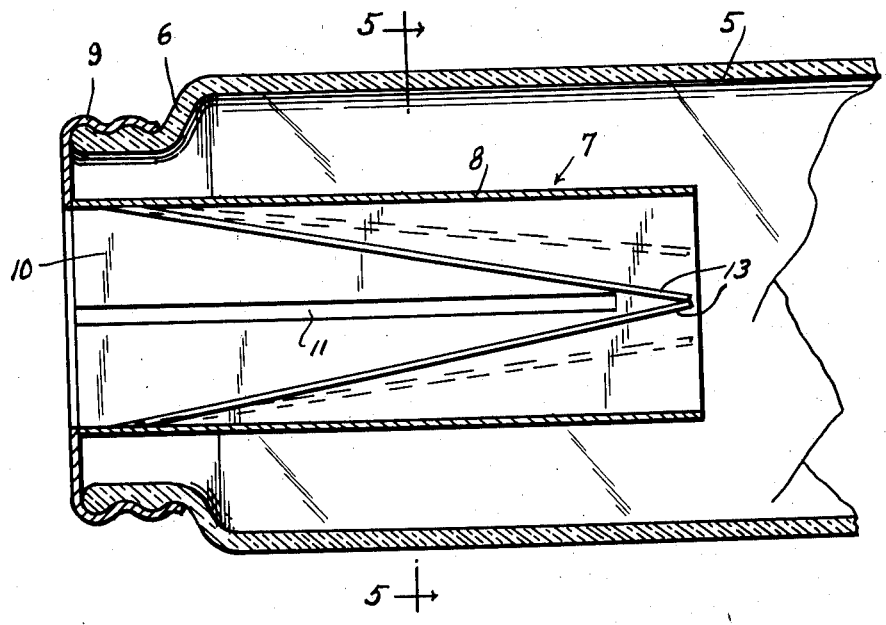
Figure 3 represents a fragmentary horizontal sectional view taken substantially on line 3—3 of Figure 1.
Figure 5:
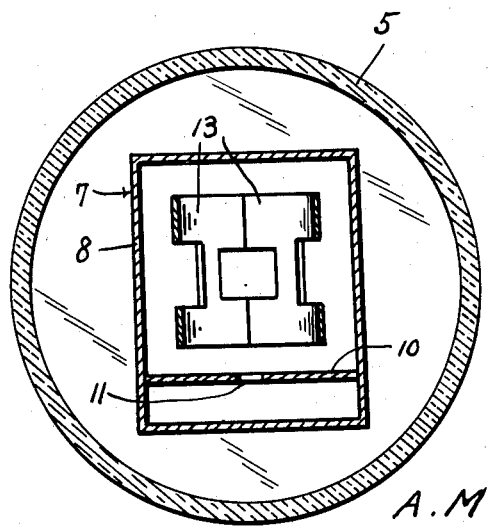
Figure 5 represents a vertical sectional view taken substantially on line 5—5 of Figure 3.

Numerals 13—13 represent H-shaped spring members, one end of each being secured to a side wall of the tunnel-like structure 8, adjacent the outer end thereof, while the free ends impinge against each other in the manner substantially shown in Figures 3 and 5, thus forming a closure which is sufficiently fabricated to permit the creature to see its way clear through the tunnel and into the container 5.

Suitable bait can be placed in the chamber 14 below the super-floor 10 to attract the creature into the tunnel-like structure 8 and as he cannot reach this bait, his efforts will be to get beneath the tunnel 8 and in so attempting, will pass between the free ends of the springs 13 and enter the container 5, after which the spring members will close off the passageway of the tunnel-like structure 8 behind him so that he cannot return.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A trap of the character described comprising a container, a threaded neck at one end of the container, a cap for the said threaded neck, said cap being provided with an opening therein, a tunnel-like structure extending from the cap at the edge portion of the opening therein toward the interior of the container, non-return closure means in the said tunnel-like structure, said tunnel-like structure being provided with a slotted super-floor spaced from the bottom of the tunnel-like structure to provide a bait compartment beneath the same, and a movable closure at the cap end of the compartment.

2. A trap of the character described comprising a container, a threaded neck at one end of the container, a cap for engagement with the said neck, said cap being provided with an opening therein, a tunnel-like structure extending from the cap at the edge portion of the opening therein toward the interior of the container, said tunnel being provided with a horizontal partition therein closely spaced from the bottom of the tunnel to define a bait compartment, said partition being provided with a longitudinally extending slot therein, and a pair of converging spring members in the tunnel, each secured at its cap end to one of the vertical side walls of the tunnel, while the free ends substantially abut each other and terminate substantially over the inner end of the said slot.

ALFRED M. JOHNSON.